US006896340B2

(12) United States Patent
Kinser et al.

(10) Patent No.: US 6,896,340 B2
(45) Date of Patent: May 24, 2005

(54) SYSTEM AND METHOD FOR MAINTAINING A VEHICLE AT ZERO SPEED ON A GRADED SURFACE

(75) Inventors: Christopher A. Kinser, Lake Orion, MI (US); George M. Claypole, Fenton, MI (US); Sunil M. Chhaya, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/664,324

(22) Filed: Sep. 17, 2003

(65) Prior Publication Data

US 2005/0057090 A1 Mar. 17, 2005

(51) Int. Cl.[7] .............................................. B60T 8/32
(52) U.S. Cl. ..................... 303/192; 303/20; 477/92; 477/172; 477/185; 701/54
(58) Field of Search .................... 188/DIG. 2; 303/191, 303/192, 20; 477/92, 93, 114, 185, 170, 172; 701/53, 54, 70

(56) References Cited

U.S. PATENT DOCUMENTS

| 4,666,021 | A | * | 5/1987 | Messersmith ............... 188/331 |
| 5,916,062 | A | * | 6/1999 | Siepker ....................... 477/194 |
| 6,000,488 | A | * | 12/1999 | Atkinson ..................... 180/248 |
| 6,278,916 | B1 | * | 8/2001 | Crombez ...................... 701/22 |
| 6,336,689 | B1 | * | 1/2002 | Eguchi et al. .............. 303/187 |
| 6,590,299 | B2 | * | 7/2003 | Kuang et al. ............. 290/40 C |
| 2002/0063022 | A1 | * | 5/2002 | Shaw et al. ................ 188/72.1 |
| 2004/0012250 | A1 | * | 1/2004 | Kuno et al. ................... 303/20 |

* cited by examiner

Primary Examiner—Robert A. Siconolfi
Assistant Examiner—Devon Kramer
(74) Attorney, Agent, or Firm—Christopher DeVries (57) ABSTRACT

Methods and apparatus are provided for determining when vehicle powertrain torque is being used to substantially maintain a vehicle at a substantially zero speed on a graded surface, and to shift the supplied torque from the powertrain to another vehicle system or component. A vehicle controller determines that the powertrain system is supplying a hold torque, which has a magnitude sufficient to substantially maintain the vehicle at a substantially zero speed on the graded surface. A brake torque at a magnitude at least equivalent to the hold torque is automatically applied from the vehicle brake system to thereby maintain the vehicle at the substantially zero speed. Thus, the powertrain system can remove the torque it is supplying to hold the vehicle at the substantially zero speed.

31 Claims, 4 Drawing Sheets

SYSTEM AND METHOD FOR MAINTAINING A VEHICLE AT ZERO SPEED ON A GRADED SURFACE

FIELD OF THE INVENTION

The present invention generally relates to vehicle control and, more particularly, to a system and method for maintaining a vehicle at a substantially zero speed on a graded road or other surface.

BACKGROUND OF THE INVENTION

When a vehicle is on a graded surface, the vehicle experiences a gravitational force component that acts to move the vehicle in a generally downward direction, which may be in a direction opposite to the direction the vehicle driver wants the vehicle to move. For example, if the vehicle is moving up a graded surface or hill, in either a forward or a rearward direction, a gravitational force component will act in the opposite direction, tending to counteract the torque supplied by the vehicle powertrain. Thus, as many vehicle drivers have experienced, when moving a vehicle up a graded surface, the torque output from the vehicle powertrain typically needs to be increased in order to maintain the vehicle at the same speed on the graded surface as the vehicle had on a generally flat, or non-graded, surface.

In addition, if a vehicle driver wants to maintain the vehicle at a substantially stationary position (e.g., substantially zero speed) on a graded surface, the driver can do any one of several things. For example, the driver can apply the brakes or other brake command device, such as hand control, etc., or place the vehicle transmission shifter (if so equipped) in, for example, the "PARK" position. Alternately, in case of a manual transmission, the transmission can be locked in first gear with the parking brake applied to hold the vehicle on a grade. Yet another method that some drivers employ to maintain the vehicle at a substantially zero speed on a graded surface is to request that the powertrain supply a torque that is equal and opposite the gravitational force component. Typically, this torque request is provided by the vehicle driver pressing the vehicle "accelerator pedal" or "throttle pedal."

Using the powertrain to supply a torque that is equal and opposite the gravitational force component can be, in many instances, used successfully to maintain a vehicle position on a graded surface. However, this method can result in powertrain component damage and/or reduce the lifetime of the powertrain and/or its components. For example, the torque converter in an automatic transmission-equipped vehicle, or the clutch in case of a manual transmission, can generate heat that may be of a magnitude sufficient to cause damage to the powertrain if this condition is maintained for a relatively long period of time. Moreover, in a vehicle powered by an electric motor, the motor may draw a so-called "stall current," which can result in excessive heat generation, unnecessary power consumption, and potential component damage.

Accordingly, it is desirable to provide a system and method that can determine when vehicle powertrain torque is being used to substantially maintain a vehicle at a substantially zero speed on a graded surface, and to shift the supplied torque from the powertrain to another vehicle system or component such as the vehicle brake system. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A method and apparatus are provided for determining when vehicle powertrain torque is being used to substantially maintain a vehicle at a substantially zero speed on a graded surface, and to shift the supplied torque from the powertrain to another vehicle system or component.

In one embodiment, and by way of example only, a method of maintaining a vehicle having a powertrain system and a brake system at a substantially zero speed on a graded surface includes determining that the powertrain system is supplying a hold torque. The hold torque has a magnitude sufficient to substantially maintain the vehicle at a substantially zero speed on the graded surface. A brake torque at a magnitude at least equivalent to the hold torque is automatically applied from the vehicle brake system to thereby maintain the vehicle at the substantially zero speed.

In another exemplary embodiment, a control system for maintaining a vehicle at a substantially zero speed on a graded surface includes a powertrain controller and a brake controller. The powertrain controller is adapted to receive one or more signals representative of vehicle powertrain system status and is operable, in response thereto, to determine that the powertrain system is supplying a hold torque and to issue a brake apply request signal in response to this determination. The hold torque has a magnitude sufficient to substantially maintain the vehicle at a substantially zero speed on the graded surface. The brake controller is coupled to receive the brake apply request signal from the powertrain controller and is operable, in response thereto, to issue a vehicle brake apply command to a vehicle brake system to thereby cause the vehicle brake system to apply a brake torque at a magnitude at least equivalent to the hold torque, whereby the vehicle is substantially maintained at the substantially zero speed.

In yet another exemplary embodiment, an automobile includes a powertrain system, a powertrain controller, a brake controller, and a brake system. The powertrain system includes an engine that is operable to supply an engine torque, and a transmission that is coupled to receive the engine torque and is operable to selectively transmit the received engine torque to one or more vehicle wheels. The powertrain controller is coupled to receive one or more signals representative of vehicle powertrain system status and is operable, in response thereto, to determine that the powertrain system is supplying a hold torque and to issue a brake apply request signal in response to this determination. The hold torque has a magnitude sufficient to substantially maintain the vehicle at a substantially zero speed on the graded surface. The brake controller is coupled to receive the brake apply request signal from the powertrain controller and is operable, in response thereto, to issue a vehicle brake apply command. The brake system is coupled to receive the vehicle brake apply command signal from the brake controller and is operable, in response thereto, to apply a brake torque to the vehicle wheels at a magnitude at least equivalent to the hold torque, whereby the vehicle is substantially maintained at the zero speed. The brake command issued by the brake controller causes the brake system to increase the brake torque to at least the hold torque at a first rate, and the powertrain controller, in response to a communication from the brake controller, causes the powertrain system to decrease the torque it supplies at a second rate.

BRIEF DESCRIPTION OF THE DRAWINGS

The present invention will hereinafter be described in conjunction with the following drawing figures, wherein like numerals denote like elements, and.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background or the following detailed description.

Figure 1:
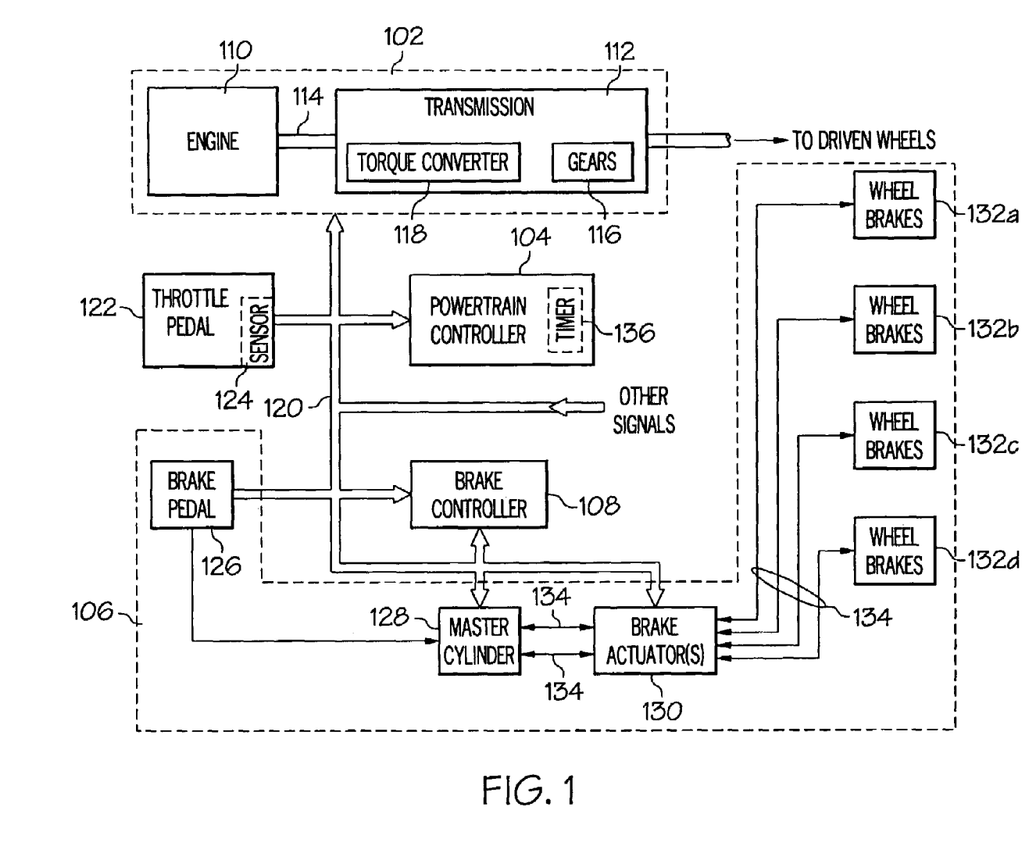
FIG. 1 is a simplified functional block diagram of vehicle system that includes a vehicle powertrain subsystem and vehicle brake subsystem according to an exemplary embodiment of present invention.

An exemplary embodiment of a vehicle system 100 is illustrated in FIG. 1. The vehicle system 100 includes a powertrain 102, a powertrain controller 104, a vehicle brake system 106, and a brake controller 108. The powertrain system 102 includes an engine 110 and a transmission 112. The engine 110 is the prime mover of the vehicle system 100 and generates the torque necessary to accelerate the vehicle system 100 to a desired velocity, and to maintain the vehicle at this desired velocity. It should be appreciated that the engine 110 may be any one of numerous engine designs including, but not limited to, any one of numerous diesel or internal combustion engine designs, any one of numerous known electric motor designs, a hybrid design of fuel-powered and electric engines, or a fuel cell.

The torque generated by the engine 110 is supplied, via an engine output shaft 114, to the transmission 112. The transmission 112 in turn couples the torque supplied from the engine 110 to various numbers of driven wheels (not illustrated) via a power matching device, such as selected ones of a plurality fixed gear ratios 116, in the case of a discrete shifting automatic or manual transmission, or via the friction element in case of a continuously variable transmission (CVT) or, by selecting the correct input speed of the engine-coupled motor, in case of an electric variable transmission (EVT), as employed by Toyota Prius. The transmission 112 may additionally include a launch device that allows the speed discrepancy between engine RPM and the transmission input shaft RPM at very low speeds, such as a torque converter 118, which provides a hydrodynamic coupling for an automatic or continuously variable transmission, or a dry or wet clutch, providing the friction coupling for a manual transmission, or a generator-motor combination providing electric coupling, as in case of an EVT, between the engine 110 and the transmission 112. The power matching device (transmission) 112 and launch device (torque converter for automatic transmission or CVT, or a clutch, in case of a manual transmission, or a generator-motor combination, in case of an EVT or a series hybrid) 118 may be any one of numerous known power matching device (transmission) and launch device (torque converter for automatic transmission, or a clutch, in case of a manual transmission, or a generator-motor combination in case of an EVT or series hybrid) designs. The transmission can also be a totally hydraulic (as in case of a hydraulic accumulator based hybrid) or pure electric traction device for a fuel cell-based or series hybrid powertrain.

The powertrain controller 104 is in operable communication with, and monitors and controls the operation of, the powertrain system 102. In particular, the powertrain controller 104 receives various signals from the powertrain system 102 and from various other vehicle systems and components. In the depicted embodiment, these signals are supplied over a communications data bus 120, though it will be appreciated that the signals could be supplied over individual conductors, or a combination of individual conductors and a data bus. It will additionally be appreciated that the number and type of parameters monitored by the powertrain controller 104 may vary from engine type to engine type. For an internal combustion type engine 110, non-limiting exemplary parameters include mass air flow rate to the engine, transmission fluid temperature, engine rotational speed, wheel rotational speed, and selected transmission gear ratio. For an electric motor type engine 110, non-limiting exemplary parameters may include one or more of these same parameters, in addition to current magnitude being drawn by the motor. No matter which type of engine 110 is used, the powertrain controller 104 also receives an input signal from a vehicle throttle pedal 122, which is representative of the amount of engine torque being requested by the vehicle driver. As depicted in FIG. 1, the throttle pedal 122 may include a position sensor 124 that supplies a signal representative of vehicle throttle pedal position.

In response to the signals it receives, the powertrain controller 104 generates and issues appropriate commands to effect powertrain control. For example, the powertrain controller 104 controls such operations as, but not limited to, shift sequence, shift timing, engine fuel (or current) supply magnitude, fuel scheduling, and various transmission pressures. In addition to these generally known operational controls, the powertrain controller 104 also operates in conjunction with the brake controller 108 to effect a throttle hold relief process when the powertrain system 102 is being used to maintain the vehicle system 100 at a substantially zero speed on a graded surface. This process will be described in more detail further below.

The brake system 106 may be any one of numerous brake systems now known, or designed in the future, that functions to decelerate a vehicle to a stop or some desired speed in response to a vehicle driver input. In the embodiment depicted in FIG. 1, which is merely exemplary of one of the numerous known brake systems, the brake system 106 is shown to include a brake pedal 126, a master cylinder 128, brake actuators 130, and a plurality of wheel brakes 132*a–d*. With this system, when the brake pedal 126 is depressed, this mechanical movement is input to the master cylinder 128, which in turn transfers this mechanical movement to hydraulic fluid in the master cylinder 128 and brake system hydraulic lines 134 that fluidly couple the brake actuators 130 and wheel brakes 132*a–d* to the master cylinder 128. The brake actuators 130 supply hydraulic fluid to the wheel brakes 132*a–d* at a controlled pressure to achieve the desired deceleration. As is described in more detail below, the brake actuators 130 will also supply hydraulic fluid to the wheel brakes 132*a–d* to generate a desired brake torque magnitude when commanded to do so by the brake controller 108, whether the brake pedal 126 is depressed or not.

The brake controller 108 is in operable communication with, and monitors and controls the operation of, the brake system 106. The brake controller 108 receives various signals from the brake system 106 and, in response to these signals, issues appropriate commands to control brake system operation. For example, in the depicted embodiment, the brake controller 108 receives a signal from the brake pedal 126 representative of its position. The brake controller 108 additionally receives one or more signals from the master cylinder 128 such as, for example, hydraulic fluid pressure. The brake controller 108 may also receive one or more signals from other vehicle systems and components not shown in FIG. 1, one or more of which may be the same as those received by the powertrain controller 104. As was noted above, the controller 108 is operable to, among other things, issue commands to the brake actuators 134 that will cause the brake actuators 130 to supply hydraulic fluid to the wheel brakes 132*a–d*. This particular function is described in more detail below. Similar to the powertrain controller 104, the signals are supplied to the brake controller 108 via the communications data bus 120. Again however, it will be appreciated that the signals could be supplied over individual conductors, or a combination of individual conductors and a data bus. It will additionally be appreciated that the number and type of parameters monitored by the brake controller 108 may vary for differing types of brake systems 106.

In addition to being in operable communication with the brake system 106, the brake controller 108 is in operable communication, preferably via the communications data bus 120, with the powertrain controller 104. This operable communication is provided to, among other things, implement the above-mentioned throttle hold relief process, which will now be described in detail. In doing so, reference should now be made to FIG. 2, in combination with FIG. 1 as appropriate. The parenthetical references in FIG. 2 correspond to the particular reference numerals of the methodological flow illustrated therein.

Figure 2:
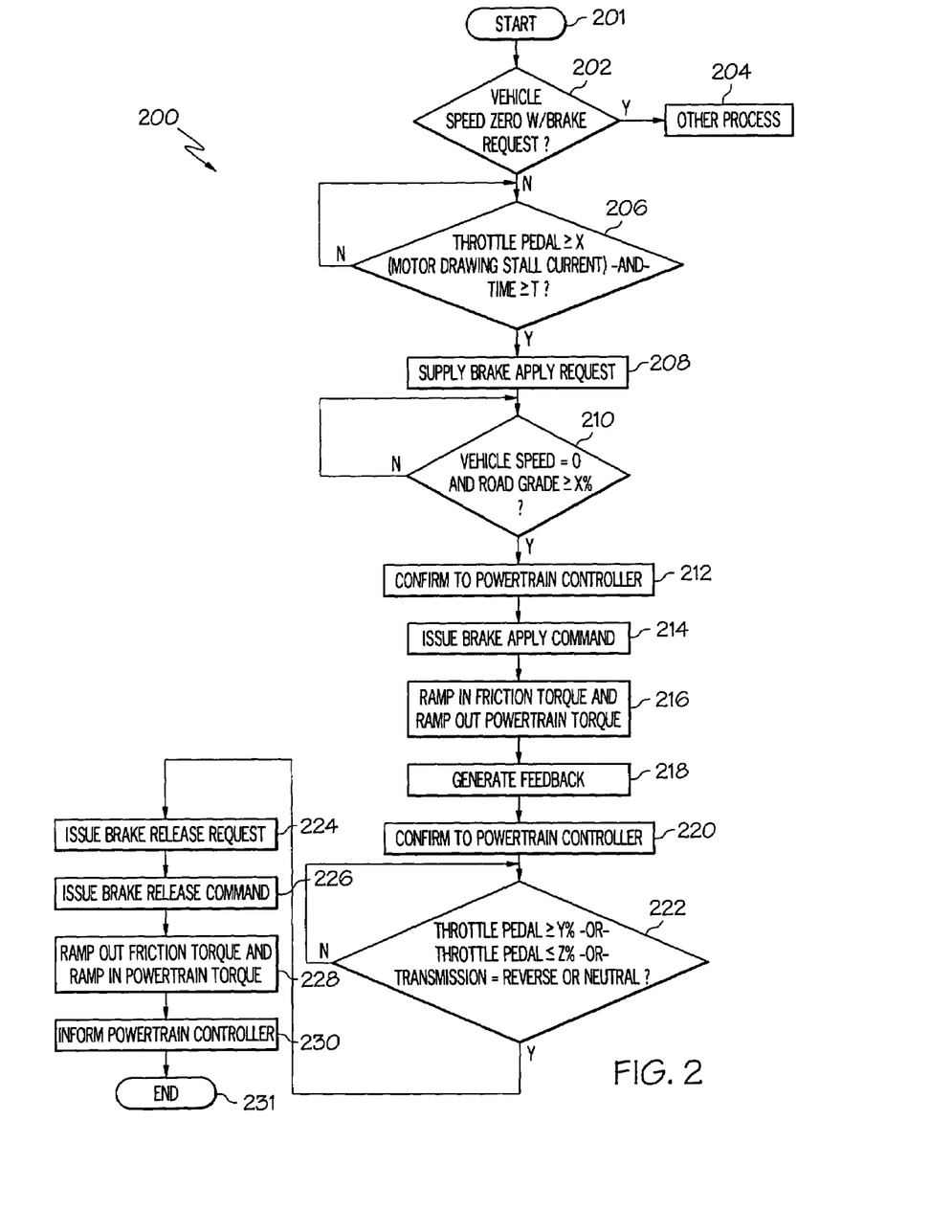
FIG. 2 is a flowchart depicting a method that may be implemented by the exemplary system of FIG. 1 for maintaining a vehicle at a substantially zero speed on a graded surface according to an exemplary embodiment.

Whenever the vehicle is in operation, the powertrain controller 104, using one or more of the various input signals alluded to above, monitors the powertrain system 102. As part of this monitoring process, the powertrain controller 104 determines whether the powertrain system 102 alone is supplying a so-called hold torque, which is a torque having a magnitude sufficient to substantially maintain the vehicle at a substantially zero speed. To do so, the powertrain controller 104 first determines whether the vehicle is being maintained at a substantially zero speed with or without the aid of the brake system 106 (202). The powertrain controller 104 may make this determination using any one of numerous methods. For example, if the vehicle transmission 112 is not in PARK or NEUTRAL, the wheel speed signals (or any other vehicle speed sensors) indicate the vehicle is not moving, and the brakes are not being applied, then the powertrain controller 104 may determine that the powertrain system 102 is generating the hold torque. It will be appreciated that various other techniques and/or algorithms may be used to make this determination. It will additionally be appreciated that, although the powertrain controller 104 is described as making this determination, various other devices could be used to make this determination and subsequently communicate it to the powertrain controller 104.

If the hold torque is being generated by, or with the aid of, the wheel brakes 132*a–d*, the brake controller 108 may be configured to implement another process (204), which does not form part of the claimed invention, and will therefore not be further described. Conversely, if it is determined that the powertrain system 102 is supplying the hold torque, the powertrain controller 104 then determines whether to shift the hold torque from the powertrain system 102 to the brake system 106 (206). To do this, the powertrain controller 104, in the depicted embodiment, determines if two criteria are met. First, for a fuel-powered engine it looks to see if the throttle pedal 122 is at least at a predetermined position, and for an electric motor engine it looks to see if the motor is drawing stall current. Second, the powertrain controller 104 determines if the first criterion is met for a predetermined time period. In the depicted embodiment, this predetermined time period is 5 seconds. However, it will be appreciated that the predetermined time period may vary from, for example, vehicle to vehicle, or between vehicle model types. Moreover, the powertrain controller 104 may include an integral timer circuit 136 to make this determination, or a timer circuit external to the powertrain controller 104 may be used. No matter the particular configuration, if one or both of these criteria are not met, then the powertrain controller 104 continues monitoring these parameters. However, if or when both criteria are met, then the powertrain controller 104 communicates a brake apply request to the brake controller 108 (208).

The brake controller 108 receives the brake apply request from the powertrain controller 104 and, in the depicted embodiment, responsively determines whether two criteria are met (210). First, it makes an independent determination that the vehicle 100 is at a substantially zero speed. And second, it determines whether the road grade is at least a predetermined minimum grade. The brake controller 108 may make this determination in any one of numerous ways. For example, the vehicle 100 may be equipped with a sensor that provides a signal to the brake controller 108 representative of grade, or the brake controller 108 may implement an algorithm using various input signals, or the powertrain controller 104 may implement such an algorithm and supply the signal to the brake controller 108. A minimum grade value of 4% is exemplary of one value that may be used. It will be appreciated, however, that the predetermined minimum grade may vary depending on, for example, vehicle model, or from vehicle to vehicle. Once these two criteria are met, the brake controller 108 sends a confirmation signal to the powertrain controller 104, confirming that it will command the brake system 106 to apply the hold torque (212).

Thereafter, the brake controller 108 issues a vehicle brake apply command to the vehicle brake system 106 (214). More particularly, in the depicted embodiment, the brake controller 108 issues the command to the brake actuators 130, which in turn activate the wheel brakes 132*a–d* at a desired magnitude to achieve the desired brake torque magnitude. The brake torque should be at least equal to, and preferably greater than, the hold torque that was being generated by the powertrain system 102. The hold torque can be determined in the powertrain controller 104 and communicated to the brake controller 108, or the brake controller 108 can determine the hold torque from grade information, which may be provided from the above-mentioned sensor. In a particular preferred embodiment, the brake controller 108 commands the brake actuators 130 to activate the wheel brakes 132*a–d* to the desired torque magnitude at a desired rate. Thus, the friction torque from the brake system 106 is ramped up to the desired torque magnitude at a desired rate, and the torque generated by the engine 110 is ramped down at a desired rate (216). If the engine 10 is an internal combustion engine, the powertrain controller 104 will reduce the torque generated by issuing an appropriate command to ramp down the fuel supply to the engine, and bring the engine 110 to an idle condition. If the engine 110 is an electric motor, the powertrain controller 104 will reduce the torque generated by the electric motor at the desired rate by ramping down the current being supplied to the motor.

Upon issuance of the vehicle brake apply command, or shortly thereafter, the brake controller 108 may generate some type of feedback indication to inform the vehicle driver that the hold torque is being supplied from the brake system 106 rather than the powertrain system 102 (218). This feedback indication may take any one of numerous forms. For example, the brake controller 108 may illuminate a light in the vehicle interior, or it may initiate an audible indicator, or a combination of both of these. Alternatively, in response to a signal from the brake controller 108, the powertrain controller 104 or other system in the vehicle 100 may generate the feedback indication, which may include a light, an alarm, or both, or may cause the vehicle powertrain system 102 to generate a perceptible vibration. It will be appreciated that such feedback indication may not be included in some embodiments. The brake controller 108 also supplies an information signal to the powertrain controller 104, informing the powertrain controller 104 that the brake system 106 is supplying the hold torque (220).

Upon receipt of the information signal from the brake controller 108, the powertrain controller 104 monitors one or more of the input signals supplied to it to determine whether or not the brake torque should be released (222). In the depicted embodiment, the powertrain controller 104 monitors throttle pedal position and the transmission gear selected by the vehicle operator. More particularly, if the powertrain controller 104 determines that the driver is requesting additional torque, beyond the hold torque, to move the vehicle up the grade, or that the vehicle driver wants to allow the vehicle to roll down the grade, or that the vehicle driver has placed the transmission 112 in NEUTRAL or REVERSE, then it issues a brake release request signal to the brake controller 108 (224).

It will be appreciated that the powertrain controller 104 may implement any one of numerous methods to determine that the vehicle driver is requesting additional torque to move the vehicle 100 up the grade, or that the vehicle driver wants to allow the vehicle 100 to roll down the grade. In the depicted embodiment, however, the powertrain controller 104 makes this determination based on throttle pedal position. Specifically, if the vehicle driver positions the throttle pedal 122 a predetermined amount beyond its original hold torque position, then the powertrain controller 104 determines that the vehicle driver is requesting a movement torque to move the vehicle up the grade. Similarly, if the vehicle driver positions throttle pedal 122 a predetermined amount below its original hold torque position, then the powertrain controller 104 determines that the vehicle driver wants to allow the vehicle to roll down the grade.

Upon receipt of the brake release request signal, the brake controller 108 issues a vehicle brake release command to the vehicle brake system 106 (226). Thus, in the depicted embodiment, the brake controller 108 issues the brake release command to the brake actuators 130, which in turn causes the wheel brakes 132a–d to release the applied brake torque. In a particular preferred embodiment, the powertrain controller 104 supplies information representative of a decreasing request for hold torque at the desired rate to the brake controller 108. In response, the brake controller 108 would issue the brake release command to the brake actuators 130 in a manner that causes the wheel brakes 132a–d to release the applied torque at the desired rate. In an alternate embodiment, the brake controller 108 can command the brake actuators 130 such that the wheel brakes 132a–d release the brake torque at the desired rate. In either case, the friction torque from the brake system 106 is ramped down from the hold torque to zero (228). Upon release of the wheel brakes 132a–d, the brake controller 108 informs the powertrain controller 104 (230).

Figure 3:
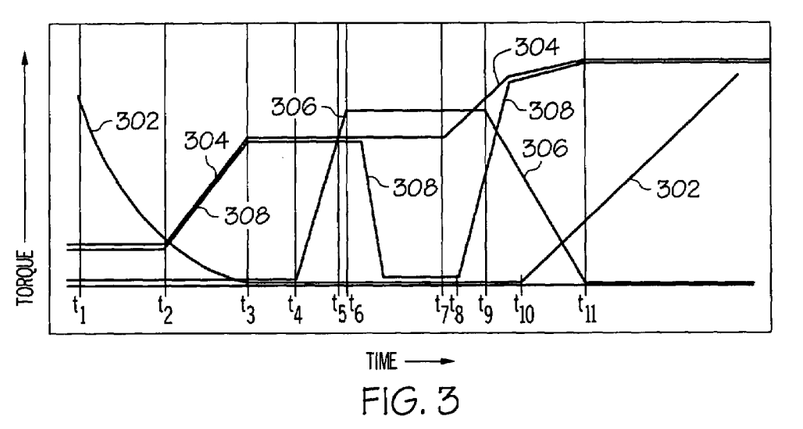
FIGS. 3–5 are graphs depicting torque vs. time in the exemplary system of FIG. 1 implementing the exemplary method of FIG. 2 under various operating conditions.

Exemplary embodiments of both the system and method have been described in detail. Now, with reference to FIGS. 3–5, a description of three different operational scenarios implemented by a driver of a vehicle 100 that includes the above-described system will be provided. With reference first to FIG. 3, it is seen that the vehicle, at time $t_1$, begins moving up a graded surface, and vehicle speed 302 begins decreasing. At time $t_2$, the driver requested torque 304 begins increasing; however, vehicle speed 302 continues decreasing due to the force of gravity. Then, at time $t_3$, the driver requested torque 304 reaches the point where it counteracts the gravitational force (e.g., the hold torque), and vehicle speed 302 is maintained at a substantially zero magnitude. At this point, the powertrain controller 104 determines that the powertrain system 102 is maintaining the zero vehicle speed without the aid of the wheel brakes 132a–d, and begins determining, as described above, whether it should make the brake apply request to the brake controller 108.

At time $t_4$, the powertrain controller 104 issues the brake apply request to the brake controller 108, which in turn issues a vehicle brake apply command. As a result, the brake torque 306 begins increasing at a desired rate to shift the hold torque from the powertrain system 102 to the brake system 106, with no brake pedal request 310. As the brake torque 306 is ramped up, it exceeds the driver requested torque 304, at time $t_5$, and reaches a predetermined magnitude at time $t_6$. As FIG. 3 also indicates, the engine torque 308 is ramped down at a desired rate.

The brake system 106 is now being used to generate the hold torque. However, at time $t_7$, the vehicle driver wishes to once again move up the graded surface, and thus the driver requested torque 304 begins increasing. Shortly thereafter, at time $t_8$, the torque the powertrain 102 generates 308 begins increasing. Then, at time $t_9$, the powertrain controller 104, as described above, determines that the vehicle driver wants to move up the grade, and issues a brake release request signal to the brake controller 108. Upon receipt of the brake release request signal, the brake controller 108 begins ramping down the brake torque 306. Shortly thereafter, at time $t_{10}$, the vehicle begins moving forward and vehicle speed 302 once again begins increasing. At time $t_{11}$ the brake torque 306 has decreased to zero.

Figure 4:
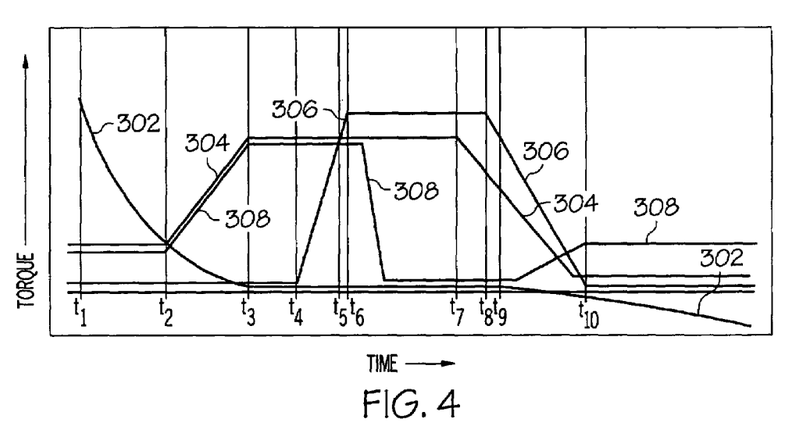

Turning now to FIG. 4, the operations from time $t_2$ through $t_6$ are substantially identical to that described above and will therefore not be further described. However, at time $t_7$, rather than driver requested torque 304 increasing, it begins decreasing, since the driver has released the accelerator pedal 112. At time $t_8$, the powertrain controller 104, as described in detail above, determines that driver wants to allow the vehicle to roll down the grade, and issues a brake release request signal to the brake controller 108. Upon receipt of the brake release request signal, the brake controller 108 begins ramping down the brake torque 306. Shortly thereafter, at time $t_9$, the brake torque 306 is sufficiently reduced in magnitude to allow the vehicle 100 to begin to roll down the grade, and vehicle speed 302 in the reverse direction begins increasing. The brake torque 306 reaches zero at time $t_{10}$, just shortly after the driver requested torque 304 has been reduced to zero.

Figure 5:
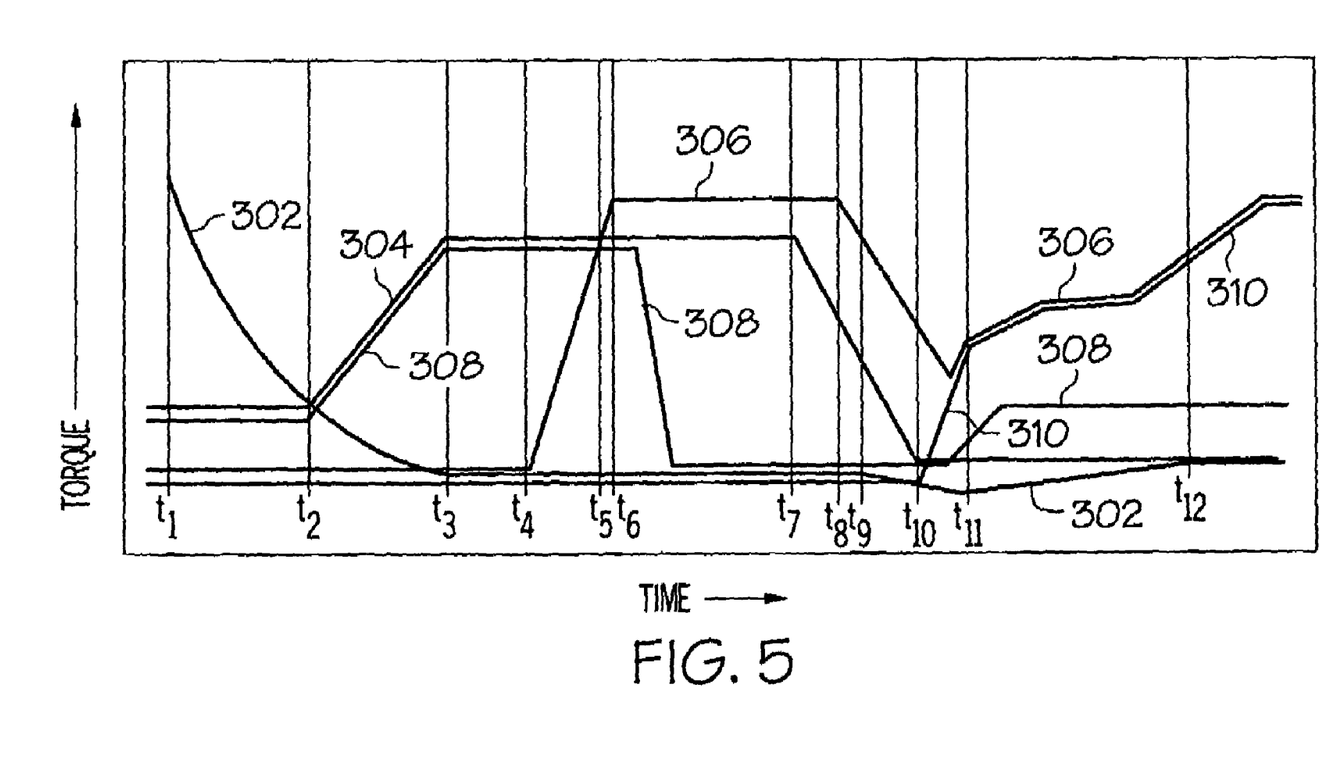

Finally, with reference to FIG. 5, another operational scenario will be described. In this instance, the operations from time $t_2$ through $t_9$ are substantially identical and will therefore not be further described. However, at time $t_{10}$ in FIG. 5, which is shortly after the vehicle begins rolling down the grade, the vehicle driver presses the brake pedal 126, as indicated by the increasing brake pedal request curve 310. At time $t_{11}$, the brake pedal request 310 from the driver is sufficient to slow the vehicle's speed 302 down the grade. Thereafter, the vehicle driver requests varying levels of brake torque, via the brake pedal, until, at time $t_{12}$, the vehicle stops.

The system and method described herein are used to determine when vehicle powertrain torque is being used to substantially maintain a vehicle at a substantially zero speed on a graded surface, and to shift the supplied torque from the powertrain to another vehicle system or component. Although the system and method were described as being implemented in a powertrain controller and a brake controller, it will be appreciated that the system and method could also be implemented in only one of these controllers, or in a separate controller, or in a separate controller in combination with one or both of these controllers.

While an exemplary embodiment(s) has been presented in the foregoing detailed description of the invention, it should be appreciated that a vast number of variations exist. It should also be appreciated that these exemplary embodiments are only examples, and are not intended to limit the scope, applicability, or configuration of the invention in any way. Rather, the foregoing detailed description will provide those skilled in the art with a convenient road map for implementing a preferred embodiment of the invention. It being understood that various changes may be made in the function and arrangement of elements described in an exemplary preferred embodiment without departing from the spirit and scope of the invention as set forth in the appended claims.

What is claimed is:

1. In a vehicle having a powertrain system and a brake system, a method of maintaining a vehicle at a substantially zero speed on a graded surface, the method comprising:
    determining that the powertrain system is supplying a hold torque, the hold torque having a magnitude sufficient to substantially maintain the vehicle at a substantially zero speed on the graded surface; and
    automatically applying a brake torque from the vehicle brake system at a magnitude at least equivalent to the hold torque to thereby maintain the vehicle at the substantially zero speed.

2. The method of claim 1, further comprising:
    determining that the powertrain system has supplied the hold torque for a time period; and
    executing the step of automatically applying a brake torque based on the time period.

3. The method of claim 2, further comprising:
    determining the time period based on a driver request using an accelerator pedal.

4. The method of claim 3, further comprising:
    determining that the accelerator pedal is at least at a predetermined position for at least the time period.

5. The method of claim 2, wherein the powertrain system includes an electric motor, and wherein the method further comprises:
    determining the time period based on the electric motor being supplied with current having a magnitude substantially equivalent to a stall current.

6. The method of claim 1, further comprising:
    increasing the brake torque from the brake system; and
    substantially simultaneously reducing the torque supplied from the powertrain.

7. The method of claim 6, wherein:
    the brake torque from the brake system is increased to at least the hold torque magnitude at a first rate; and
    the torque supplied from the powertrain is reduced at a second rate.

8. The method of claim 1, further comprising:
    determining that a vehicle driver no longer wants to maintain a substantially zero speed; and
    in response to this determination, releasing the brake torque supplied from the vehicle brake system.

9. The method of claim 8, wherein the step of determining that a vehicle driver no longer wants to maintain a substantially zero speed comprises:
    determining that the vehicle driver has requested the powertrain system supply a movement torque, the movement torque having a magnitude that exceeds the hold torque by at least a predetermined magnitude.

10. The method of claim 9, wherein the step of determining that the vehicle driver has requested the movement torque is based on an accelerator pedal being at least at a predetermined position.

11. The method of claim 8, wherein the step of determining that a vehicle driver no longer wants to maintain a substantially zero speed comprises:
    determining that the vehicle driver has requested the powertrain system supply a roll torque, the roll torque having a magnitude that is at least a predetermined amount less than the hold torque.

12. The method of claim 11, wherein the step of determining that the vehicle driver has requested the roll torque is based on an accelerator pedal being at least at a predetermined position.

13. The method of claim 8, wherein the vehicle further includes a transmission, and wherein the step of determining that a vehicle driver no longer wants to maintain a substantially zero speed comprises:
    determining that the vehicle driver has placed the vehicle transmission in either (i) neutral or (ii) in a gear that will allow the vehicle to move in a direction opposite that which gravitational force urges the vehicle to move on the graded surface.

14. The method of claim 8, further comprising:
    reducing the brake torque supplied from the brake system from the hold torque magnitude to a substantially zero magnitude at a first rate; and
    increasing the torque supplied from the powertrain system at a second rate.

15. The method of claim 1, further comprising:
    determining that the vehicle has a substantially zero speed; and
    determining that the graded surface has a grade of a predetermined magnitude.

16. The method of claim 1, further comprising:
    providing an indication to a vehicle driver that the vehicle brake system is applying the brake torque.

17. The method of claim 16, wherein the indication is an indicator light.

18. A control system for maintaining a vehicle at a substantially zero speed on a graded surface, comprising:
    a powertrain controller adapted to receive one or more signals representative of vehicle powertrain system status and operable, in response thereto, to (i) determine that the powertrain system is supplying a hold torque and (ii) issue a brake apply request signal in response to the determination, the hold torque having a magnitude sufficient to substantially maintain the vehicle at a substantially zero speed on the graded surface; and a brake controller coupled to receive the brake apply request signal from the powertrain controller and operable, in response thereto, to issue a vehicle brake apply command to a vehicle brake system to thereby cause the vehicle brake system to apply a brake torque at a magnitude at least equivalent to the hold torque whereby the vehicle is substantially maintained at the substantially zero speed.

19. The system of claim 18, further comprising:
a timer circuit operable to measure a time that the powertrain system has supplied the hold torque,
wherein the powertrain controller is in operable communication with the timer circuit and is further operable to issue the brake apply request signal when the time measured by the timer circuit is at least a first time period.

20. The system of claim 19, wherein the powertrain controller is adapted to receive an accelerator position signal representative of a vehicle accelerator pedal position and is further operable, in response thereto, to issue the brake apply request signal when the accelerator position signal has at least at a first predetermined magnitude for the first time period.

21. The system of claim 19, wherein the powertrain system includes an electric motor, and wherein the powertrain controller is adapted to receive a signal representative of a current magnitude being supplied to the motor and operable, in response thereto, to issue the brake apply request signal when the current magnitude is at least substantially equivalent to a stall current for the first time period.

22. The system of claim 20, wherein:
the vehicle brake command issued by the brake controller causes the brake system to increase the brake torque to at least the hold torque magnitude at a first rate; and
the powertrain controller, in response to the vehicle brake command, causes the powertrain system to decrease the torque supplied therefrom at a second rate.

23. The system of claim 20, wherein:
the powertrain controller is further operable, in response to the accelerator position signal having at least a second predetermined magnitude, to issue a brake release request signal; and
the brake controller is further operable, in response to the brake release request signal, to issue a brake release command to the vehicle brake system to thereby cause the vehicle brake system to release the brake torque.

24. The system of claim 23, wherein the second predetermined magnitude is greater than the first predetermined magnitude.

25. The system of claim 23, wherein the second predetermined magnitude is less than the first predetermined magnitude.

26. The system of claim 23, wherein:
the powertrain controller is further operable, in response to the accelerator position signal having at least the second predetermined magnitude, to supply a signal representative of a decreasing hold torque request; and
the brake controller is further operable, in response to the decreasing hold torque request signal, to release the brake torque at a rate.

27. The system of claim 18, wherein:
the powertrain controller is adapted to receive a signal representative of vehicle transmission status and is further operable, in response thereto, to issue a brake release request signal when the vehicle transmission signal indicates that the vehicle transmission is moved from a first directional movement status to either (i) a neutral status or (ii) a second directional movement status that is opposite the first directional movement status; and
the brake controller is further operable, in response to the brake release request signal, to issue a brake release command to the vehicle brake system to thereby cause the vehicle brake system to release the brake torque.

28. The system of claim 18, further comprising:
a road grade sensor in operable communication with the brake system controller and operable to (i) sense a grade magnitude of the graded surface and (ii) supply a road grade signal representative of the sensed grade magnitude,
wherein the brake system controller is further operable to issue the vehicle brake apply command if the sensed grade magnitude exceeds a predetermined grade magnitude.

29. The system of claim 18, wherein one of the powertrain controller and the brake system controller is further operable to generate an indication signal that the vehicle brake system is applying the brake torque.

30. The system of claim 29, further comprising:
an indicator light coupled to receive the indication signal and illuminate upon receipt thereof.

31. An automobile, comprising:
a powertrain system including:
an engine operable to supply an engine torque, and
a transmission coupled to receive the engine torque and operable to selectively transmit the received engine torque to one or more vehicle wheels;
a powertrain controller coupled to receive one or more signals representative of vehicle powertrain system status and operable, in response thereto, to (i) determine that the powertrain system is supplying a hold torque and (ii) issue a brake apply request signal in response to the determination, the hold torque having a magnitude sufficient to substantially maintain the vehicle at a substantially zero speed on a graded surface;
a brake controller coupled to receive the brake apply request signal from the powertrain controller and operable, in response thereto, to issue a vehicle brake apply command; and
a vehicle brake system coupled to receive the vehicle brake apply command and operable, in response thereto, to apply a brake torque to each vehicle wheel at a magnitude at least equivalent to the hold torque, whereby the vehicle is substantially maintained at the zero speed,
wherein the vehicle brake command issued by the brake controller causes the brake system to increase the brake torque to at least the hold torque magnitude at a first rate; and
wherein the powertrain controller, in response to the vehicle brake command, causes the powertrain system to decrease the torque supplied therefrom at a second rate.

* * * * *